UNITED STATES PATENT OFFICE.

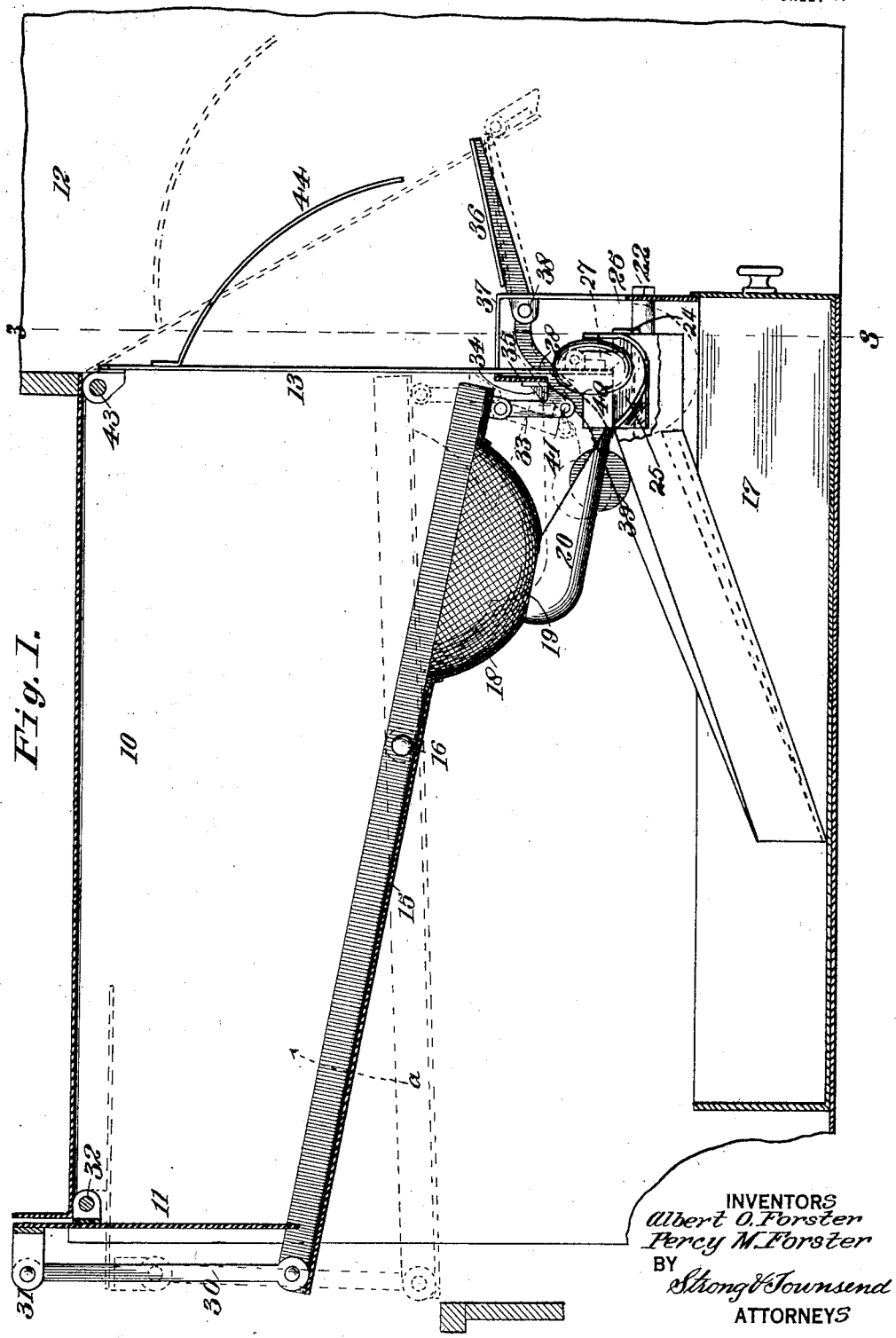

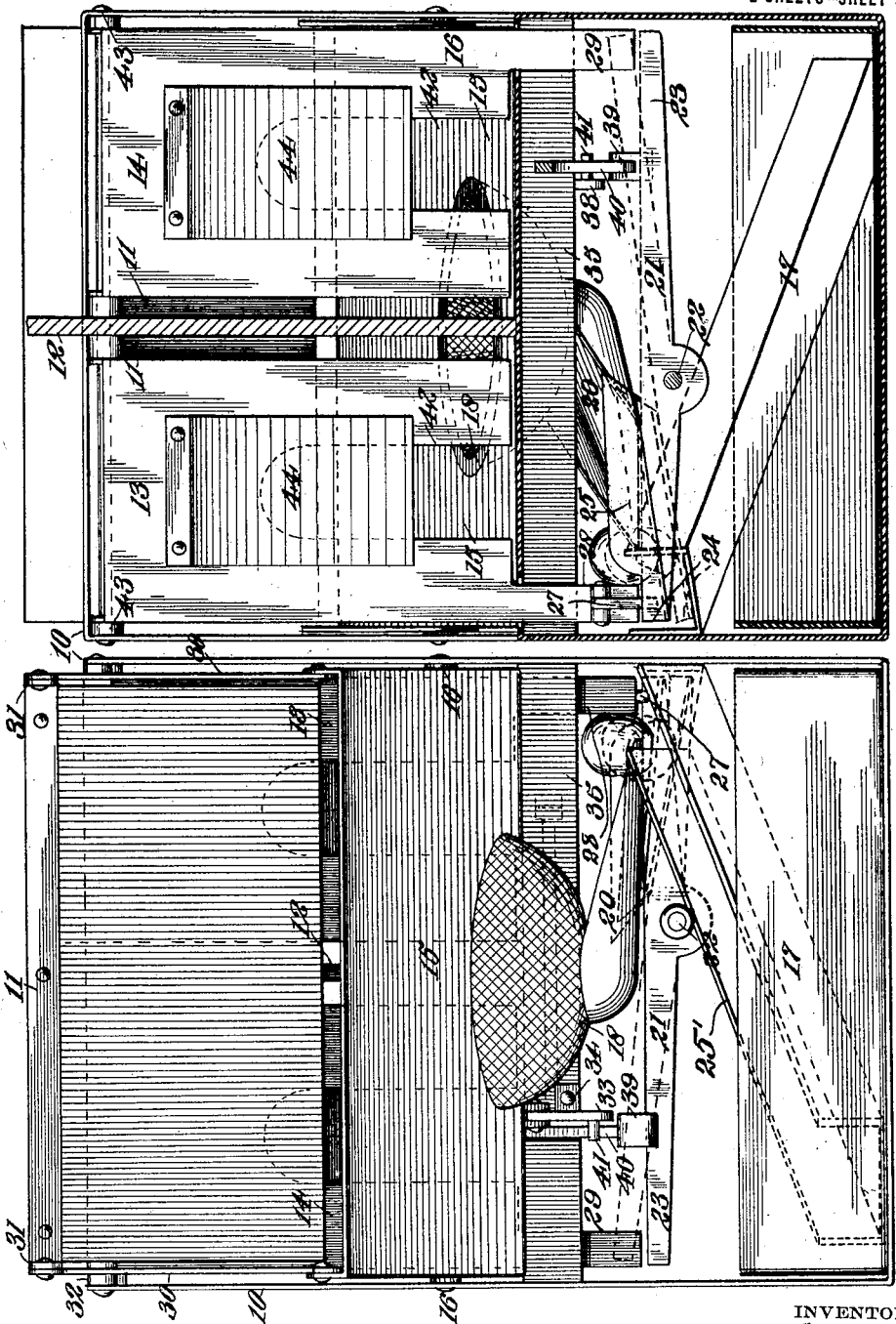

ALBERT O. FORSTER AND PERCY M. FORSTER, OF BERKELEY, CALIFORNIA.

TRAP-NEST.

1,386,327.  Specification of Letters Patent.  Patented Aug. 2, 1921.

Application filed April 10, 1919. Serial No. 288,975.

*To all whom it may concern:*

Be it known that we, ALBERT O. FORSTER and PERCY M. FORSTER, both citizens of the United States, residing at Berkeley, in the county of Alameda and State of California, have invented new and useful Improvements in Trap-Nests, of which the following is a specification.

This invention relates to a trap nest.

It is the principal object of this invention to provide a trap nest structure through which hens will pass and which is provided with means whereby the laying and non-laying hens will be separated automatically.

The invention contemplates the use of a housing having one entry door and two exit doors and inclosing a nest, the entry door being closed by the presence of a hen within the house and the exit doors being selectively unlocked by the presence of an egg within the nest or its absence therefrom.

The invention is illustrated by way of example in the accompanying drawings in which—

Figure 1 is a view in vertical central section through the complete trap nest, showing its parts in their operative position, as indicated in full lines and their normal position as indicated in dotted lines.

Fig. 2 is a view in rear elevation, showing the complete trap.

Fig. 3 is a view in front elevation with parts broken away to disclose the exit doors and the locking means therefor.

Referring to the drawings, 10 indicates a housing having walls which form a substantially square compartment. The front end of the housing is opened and is provided with a swinging door 11 by which it may be closed under conditions to be hereinafter specified. The rear end of the housing is also open and its opened portion is separated by a vertical partition 12. This provides two exit openings which are closed by doors 13 and 14 respectively. The interior of the housing is fitted with a false bottom floor 15 pivoted substantially midway its length upon a horizontal pin 16. This bottom floor is supported a considerable distance from the bottom of the housing and thus accommodates the mechanism required for operating the exit doors and an egg drawer 17.

Mounted in the rear end of the false bottom floor is a nest 18, here shown as formed of reticulated material and having an exit opening 19 at its bottom. An egg runway 20 is secured beneath this opening and in communication therewith and will conduct eggs from the nest to the locking mechanism of the exit doors. This mechanism comprises a weighing lever 21 mounted for vertical swinging movement upon a pivot pin 22. The lever comprises oppositely and horizontally extending arms 23 and 24. The arm 24 carries a tray or transferring chute 25 normally supported directly beneath the outer end of the runway 20, thus receiving the eggs which pass down this runway from the nest. Beneath the outer end of the tray 25 is positioned the upper end of a chute or runway 25', the other end of which communicates with the egg drawer 17. The arm 24 normally stands in the path of travel of a detent 27, which is pivoted upon an extension 28 of the exit door 13. Thus, when the arm 24 is in its uppermost and normal position, the movement of the detent 27 will be obstructed and the door 13 held so that it cannot open. The opposite arm 23 of the weighing lever 21 normally stands in the position shown in solid lines in Fig. 3 of the drawings and may move to the position in dotted lines to obstruct the movement of a finger 29 carried by the exit door 14. By an examination of Fig. 3, it will be evident that the weighing lever may oscillate and will alternately lock or release the separate exit doors 13 and 14.

The entry door 11 is adapted to be actuated by the weight of the hen on the floor 15 after having passed the pivot center 16. The floor 15 is provided with connecting links 30 which extend upwardly and pivotally engage brackets 31. These brackets are carried upon the outer face of the door 11 and upon extensions of this door which normally project above the hinge pin 32 thereof. The normal position of the door 11 and the false floor 15 is indicated in dotted lines in Fig. 1 and the position, when a hen is on the nest 18, is indicated in solid lines. The forward end of the floor 15 is fitted with a swinging pawl 33 which hangs downwardly and normally engages a lock lug 34. This lug is fixed to a cross member 35 of the housing and when the pawl 33 is in engagement therewith, will act to hold the floor 15 in the position shown in Fig. 1. In order that the floor 15 will be released from this locked position when the hen has passed through one of the exit openings, a tread plate 36 is mounted directly in front of the doors 13 and 14 and to form a runway in combination with the fixed floor portion 37. The tread portion 36 is hinged for vertical swinging movement upon pins 38 and is counter-balanced by a weight 39 carried upon an arm 40. The weight 39 holds the plate in its uppermost position and does not engage a releasing pin 41 which is carried by the pawl 33. However, when the tread plate is in its lowermost position, the arm 40 will strike the pin 41 and cause the pawl 33 to disengage the lug 34. This action will thus permit the heavier outer end of the floor 15 to restore the floor to the position indicated at dotted lines in Fig. 1.

The doors 13 and 14 are each provided with an opening 42 through which the hen may extend her head. This opening is not large enough, however, to permit the passage of her body therethrough and as she forces outwardly upon the door, it will swing upon the hinge pin 43, providing this door has been released by the egg-controlled mechanism. Baffle plates 44 are fitted upon each of the doors to prevent chickens or other animals from standing upon the tread plate 36 and thus also preventing the entry door 11 from being unlocked while the hen is on the nest.

In operation, the floor 15 is in the position shown in the dotted lines in Fig. 1. The hen may then pass in through the open doorway of the housing and will walk to the nest 18. After having passed the center 16 upon which the floor 15 is pivoted, the floor will swing upwardly in the direction of arrow a, as shown in Fig. 1 and this will act to force the links 30 upwardly and swing the entry door 11 into its closed position. At the same time, the pawl 33 will engage the underface of the lug 34 and lock the floor. When an egg has been laid, it will pass along the runway 20 into the tray 25 and roll up against the detent 27. The presence of the egg in this position upon the weighing lever will cause the corresponding end of the lever to swing downwardly to the dotted line position as indicated in Fig. 2 and will move the arm 24 out of an obstructing position before the detent 27, at the same time moving the arm 23 up into a position in front of the finger 29 to lock the door 14. The hen may then force the door 13 open and pass into the yard set apart for laying hens. As the hen forces the door, the detent 27 will swing outwardly and permit the egg to roll into the chute or runway 25′ and from thence into the egg drawer 17. In the event that an egg is not laid, the door 13 will not be unlocked and the hen will find, by trying the exit doors, that the door 14 is unlocked and that she may pass into the yard set apart for non-laying hens. When the hen steps upon the tread plate 36, after having passed through either of the exit openings, the arm 40 will trip the pawl 33 and permit the floor to swing to its normal position, at the same time moving the door 11 to permit the entry of other hens to the nest.

It will thus be seen that the structure here disclosed, while simple in its formation and operation, at the same time provides positive and automatically acting means for separating laying and non-laying hens.

While we have shown the preferred form of our invention, it will be understood that various changes in the combination, construction and arrangement of parts may be made by those skilled in the art, without departing from the spirit of the invention as claimed.

Having thus described our invention, what we claim and desire to secure by Letters Patent is—

1. A trap nest comprising a housing, an entry opening provided with a normally open door, a pair of exit openings provided with doors, one of the doors being normally locked and the other unlocked, a nest within the housing, an egg tray in communication therewith, means whereby the presence of a hen within the housing will close the entrance door, means whereby the presence of an egg within the tray will lock the normally unlocked exit door and unlock the other exit door, the latter means including locking mechanism normally arranged to lock one of the said exit doors and actuated by the egg to another position to unlock the said normally locked exit door and lock the other exit door, means for automatically locking the entry door closed, and means for releasing the entry door operable exteriorly of the housing.

2. A trap nest comprising a housing having a normally opened entry door at one end thereof and a pair of outlet openings at the other end thereof, doors for closing said outlet openings, one of which is normally locked and the other unlocked; means whereby the presence of a hen within the housing will cause the entry door to be closed, a nest and a tray below said nest and means whereby the presence of an egg in said tray will unlock the normally locked exit door and lock the other exit door, a latch element on the last named unlocked door and adapted to hold the egg in the tray until the door is lifted by the hen in passing therethrough.

3. A trap nest comprising a housing, a false floor therein, means for pivotally supporting said floor for vertical movement from a point midway its length, a nest at one end of said floor, a pair of normally closed exit doors adjacent said end of the floor, a normally opened entry door at the opposite end of the floor, linked means between the floor and said entry door, whereby the presence of a hen on the nest will close the entry door, means for locking the floor while the hen is on the nest, and means exterior of the housing for releasing the floor from its locked position when the hen has passed through an exit door.

4. A trap nest comprising a housing, a false floor therein, means for pivotally supporting said floor for vertical movement from a point medium its length, a nest at one end of said floor, a pair of normally closed exit doors adjacent said end of the floor, a normally opened entry door at the opposite end of the floor, linked means between the floor and said entry door whereby the presence of a hen on the nest will close the entry door, latch means for locking the floor while the hen is on the nest and means exterior of the housing connected with said latch for releasing the floor from its locked position when the hen has passed through the exit door.

5. A trap nest comprising a housing having a normally open entry door at one end thereof and a pair of normally closed exit doors adjacent to the opposite end thereof, a false floor pivoted within the housing and normally inclined downward toward the opening of the entry door, a nest upon the opposite elevated end of the said floor, linked means connecting the entry door with the adjacent end of the false floor whereby the presence of a hen on the nest at the opposite end of the false floor will swing the outer end of the floor upward and close the entry door, means for ordinarily locking the floor and door in this position when the nest swings downward, means for alternately locking the exit doors, one of which is normally locked, and an egg pan carried on said locking means and adapted to reverse the locking positions thereof, means for maintaining the locking means in this position while a hen is within the housing and means operated by a hen upon exit from the housing to release the locked nest thereby opening the entry door and at the same time restoring the exit doors to their original conditions.

6. A trap nest comprising a housing, a nest therein, an entry door at one end of the housing, and a pair of exit doors at the opposite end, means whereby the presence of a hen on the nest will close the entry door, a tray below said nest, a pivotal supporting means for said tray, said means being adapted to normally lock one exit door and with the presence of an egg on the tray to unlock the normally locked exit door and lock the other exit door, and means whereby the passage of a hen through either of the exit doors will cause the entry door to return to its original position and cause an egg on the tray to roll therefrom and permit the pivotal supporting means of said egg to return to its original locking position.

In testimony whereof we have hereunto set our hands in the presence of two subscribing witnesses.

ALBERT O. FORSTER.
PERCY M. FORSTER.

Witnesses:
CHAS. H. SAMUELS,
WINIFRED J. FERRIS.